No. 868,436. PATENTED OCT. 15, 1907.
L. HERMAND.
WRENCH.
APPLICATION FILED JULY 6, 1907.
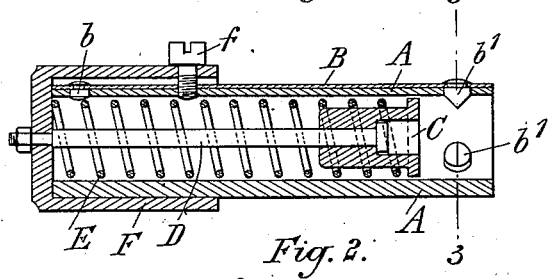
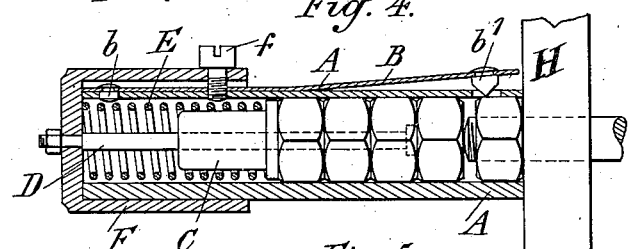
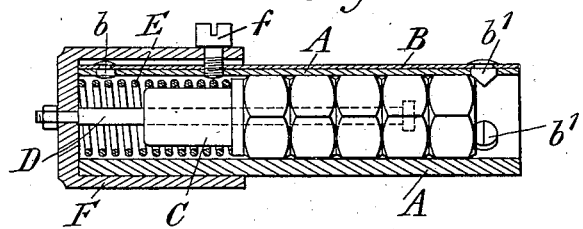
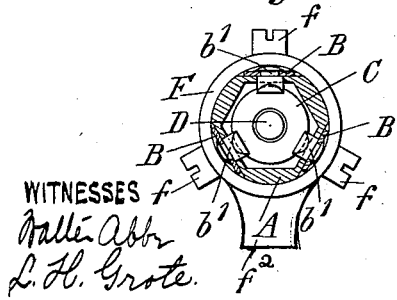
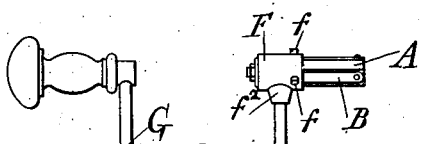
WITNESSES
INVENTOR
Lucien Hermand
BY
Howson and Howson
ATTORNEYS

UNITED STATES PATENT OFFICE.

LUCIEN HERMAND, OF MONTMORENCY, FRANCE.

WRENCH.

No. 868,436.　　　Specification of Letters Patent.　　　Patented Oct. 15, 1907.

Application filed July 6, 1907. Serial No. 382,541.

*To all whom it may concern:*

Be it known that I, LUCIEN HERMAND, a citizen of the Republic of France, of 7 Rue des Loges, Montmorency, Seine-et-Oise, in the Republic of France, manufacturer, have invented a new and useful Improved Wrench, of which the following is a specification.

This invention has for its object to provide an improved instrument, or device adapted to be applied to an ordinary brace by which instrument, or device, screw nuts can be unscrewed from bolts, or the like, and held in position in the said instrument, or device, so that the said nuts can be screwed on again in a very convenient and expeditious manner, and without necessity for handling them and so that they are not liable to be mislaid, or lost.

The instrument, or device, will, for example, be very useful in removing and replacing the nuts which are used with bolts for securing the removable tire-carrying rims of wheels and for analogous purposes where parts are secured by a series of like screw nuts.

The instrument, or device, according to this invention, consists of a tube, or casing, adapted to receive and guide the nuts in line with each other and with an end adapted to fit over, or engage with, the nuts, the said tube, or casing, being provided with a guided pusher and a spring at the rear of the series of nuts to urge them forward and with retainers which will normally hold the series of nuts in place in the tube, or casing, but will yield to allow of the end of the instrument being put over the nut for unscrewing and allow the nuts to pass them to enter the tube, or casing, as they are screwed off, or leave it when they are screwed on.

The accompanying drawing illustrates an instrument, or device, constructed in accordance with this invention:—

Figure 1 is a longitudinal section of the empty instrument, and Fig. 2 is a side elevation; Fig. 3 is a cross section on the line 3—3, Fig. 1; Fig. 4 a section similar to Fig. 1, but showing the instrument at work and containing several nuts, one of which is shown being unscrewed from the end of a bolt. Fig. 5 is a similar section to Fig. 4 showing the aforesaid nut being entirely screwed off and stored in the casing, and Fig. 6 shows the device mounted in the brace which is not shown in the other figures.

The tube or casing, A is in transverse section, of a shape and size corresponding to the nuts for which the instrument is intended to be used so that the said nuts can be easily engaged and can readily issue therefrom while being at the same time properly guided. On the outer side of this tube or casing, A are mounted spring blades B, each fixed at its rear end $b$ to the tube, or casing, and provided at its forward end with a projection $b^1$ having two oblique faces and entering openings in the sleeve through the tube, or casing, so as to protrude a short distance thereinto.

Inside the tube, or casing, A is a piece C, acting as a pusher, mounted, and capable of sliding on a central stem D fixed co-axial with the tube, or casing, a spring E pressing the pusher C towards the end of its stroke where it comes into contact with a head on the stem D, as shown in Fig. 1.

The rear end of the tube, or casing A, enters a socket-piece F to which it is secured by screws $f$ the said tube or casing being provided with a boss $f^2$ by means of which the tube, or casing, A can be secured to the brace G, as shown in Fig. 6. When, for instance, a series of nuts is to be unscrewed; when the end of the tube or casing A is passed over a nut, the projections $b^1$ are retracted, as shown in Fig. 4. By turning the instrument by means of the brace G and causing it to bear on the part of the surface H on which the nut itself is bearing, the nut, as it is unscrewed, enters the tube, or casing A against the pressure of the spring E exerted on the nut through the pusher C, till the said nut leaves the bolt, when the projections $b^1$ will keep the said nut in position (Fig. 5).

When the instrument is used to unscrew another nut, this nut similarly enters the tube or casing A and passes beyond the projections $b^1$ pushing backwards the nut last previously received therein and any preceding nuts. It is thus possible to unscrew and store in the tube or casing A as many nuts as the length of the said tube or casing A will accommodate.

When the instrument is fully, or partly, filled with nuts and it is desired to screw them on again, the instrument is put in position so that the nut which is in front (and bearing on the projections $b^1$) engages the bolt and by then turning the instrument by means of the brace G the said nut is screwed onto the bolt and moves forward under the action of the spring E while it moves the projections $b^1$ outwards and passes beyond them; the following nut then bears on the projections $b^1$ and can be screwed on its bolt in the same manner, and so on until the nuts which were in the tube, or casing, have all been screwed on.

The invention is not limited to the precise form shown, which can be modified without departing from the nature of the invention.

I claim as my invention:

1. An instrument for screwing and unscrewing nuts onto and from screws, the said instrument comprising an ordinary brace carrying a casing adapted to receive the nuts in line and with an end adapted to engage such nuts, a central stem coaxial therewith, a pusher guided on said stem and spring for moving the nuts forward in the casing and allowing them to move inwards and means for normally holding the nuts in the casing, which means are capable of yielding to allow of the passage of the nuts in screwing on and screwing off.

2. In instruments for screwing and unscrewing nuts onto and from screws, the combination of a casing in transverse section of a size and shape corresponding to the nuts to be dealt with, openings near the forward end of the said casing, oblique faced spring actuated projections protruding through the said openings, a central stem co-axial with the casing, a pusher mounted on the said stem and a spring acting to move the said pusher forward and allow it to move backward.

3. In instruments for screwing and unscrewing nuts onto and from screws, the combination with a brace of a perforated casing for containing and guiding the nuts to be dealt with, yieldable oblique faced projections passing through said perforations for retaining and allowing of the passage of nuts in screwing on and screwing off, a guided pusher and spring for pressing the nuts forward and allowing them to move backward in the casing and a socket piece for receiving the rear end of the said casing and provided with means for connecting the instrument to the brace.

4. A nut wrench comprising a tube adapted to receive a plurality of nuts and formed at one end to fit a nut and closed at the other, a central stem coaxial with said tube and a spring actuated pusher guided on said stem and opposing the entrance of the nuts into the tube.

5. A nut wrench comprising a tube adapted to receive a plurality of nuts and formed at one end to fit a nut, independent means for closing the other end of said tube and spring means carried thereby to oppose the entrance of a nut therein and yielding means to prevent its escape after entrance.

6. A nut wrench comprising a tube adapted to receive a plurality of nuts and formed at one end to fit a nut, independent means for closing the other end of said tube and spring means to oppose the entrance of a nut therein in combination with yielding means to oppose the passage of the nut in either direction through the tube.

7. A nut wrench comprising a perforated tube closed at one end, adapted to receive a plurality of nuts and formed at its open end to fit a nut, yielding angled projections passing through said perforations and spring means within the tube to oppose the entrance of a nut therein.

8. A nut wrench comprising a tube closed at one end, adapted to receive a plurality of nuts and formed at its open end to fit a nut and spring means within the tube to oppose the entrance of a nut therein, in combination with a boss adapted to receive the shank of a bit.

In testimony whereof I have signed my name to this specification in the presence of two subscribing witnesses.

LUCIEN HERMAND.

Witnesses:
JOHN BEECHER,
LOUIS POLLARD.